United States Patent Office 3,836,622
Patented Sept. 17, 1974

3,836,622
METHOD OF FORMING PIPES
Sten Ragnar Sporre, Forsheda, Sweden, assignor to Forsheda Ideutveckling AB, Varnamo, Sweden
Filed June 30, 1972, Ser. No. 267,999
Claims priority, application Sweden, July 1, 1971, 8,527/71
Int. Cl. B29d 3/00
U.S. Cl. 264—249
2 Claims

ABSTRACT OF THE DISCLOSURE

A method of forming pipes wherein the pipe wall may be constructed from fiber or threaded reinforced plastic and is formed on a mandrel and the pipe wall is provided with an inner annular wall for receiving element in the form of a ring which is stretched onto the mandrel and the pipe wall is formed around the mandrel and the sealing ring.

---

The present invention relates to a method of forming pipes, in which the pipe wall is formed by means of at least one mold portion and is provided with a groove for receiving a sealing element, e.g., a rubber sealing ring.

It is often necessary to provide a pipe with grooves for receiving or retaining sealing rings or the like. The forming of the groove requires a separate mold portion which must be retractable or extendable for making it possible to remove the pipe from the mold. Therefore, it is previously known to provide a mandrel for forming a socket at the end portion of a pipe with separate retractable and extendable mold portions. However, the function of these mold portions is complicated and it is often difficult to obtain the tolerances necessary for accomplishing the required sealing when positioning the sealing ring in the groove and connecting the pipe to another pipe.

The object of the present invention is to provide a method of forming pipes obviating the above drawbacks.

In accordance with the invention the method is characterized in that the sealing element is used as a mold portion for forming said groove when the pipe wall is formed.

In accordance with the invention it is possible to provide the end portion of a pipe consisting of a material which can be converted into a plastic state with a socket having an inner groove for retaining a sealing ring by positioning the sealing ring on a mandrel and sliding the end portion of the pipe being in a plastic state over the mandrel and the sealing ring positioned thereon, the pipe wall automatically or by means of outer jaws or the like being connected to the mandrel and the sealing ring so that there is provided a socket having a groove and a sealing ring positioned therein. Thereby it is possible to form the pipe wall so that the groove is undercut so that the sealing ring is retained in the groove.

By using the method in accordance with the invention it is also possible to manufacture a socket for connecting two non-socket or straight pipes by positioning two sealing rings at a distance from each other on a mandrel and forming a socket from thread or fiber reinforced plastic around the mandrel and the rings. When the socket is removed from the mandrel, the sealing rings are retained in the grooves forming around the sealing rings.

The invention is described in the following with reference to the drawings.

Figure 1A:
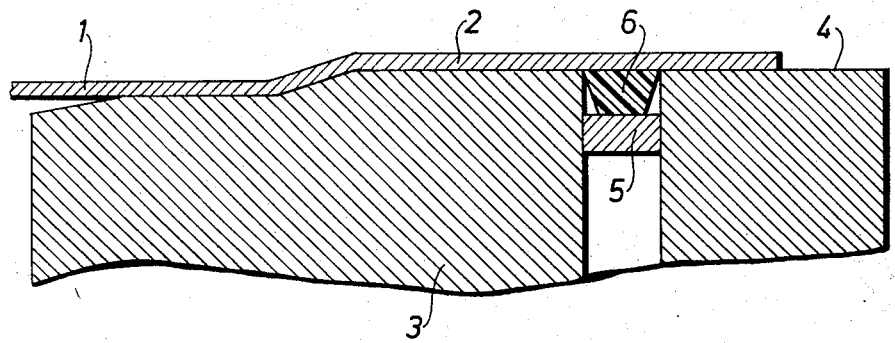
FIGS. 1a, 1b and 1c show a first embodiment of the method according to the invention.
Figure 1B:
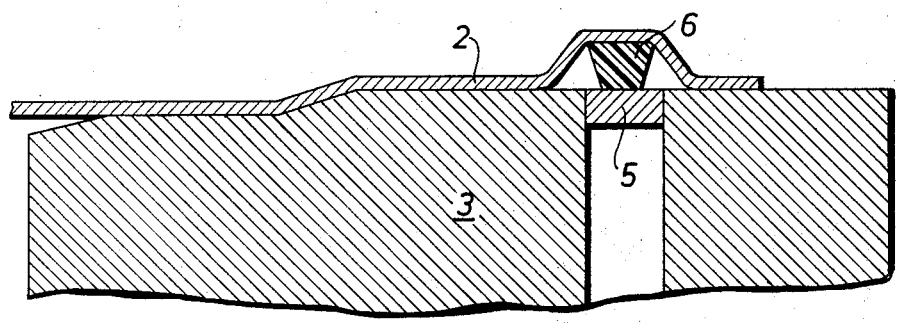
Figure 1C:
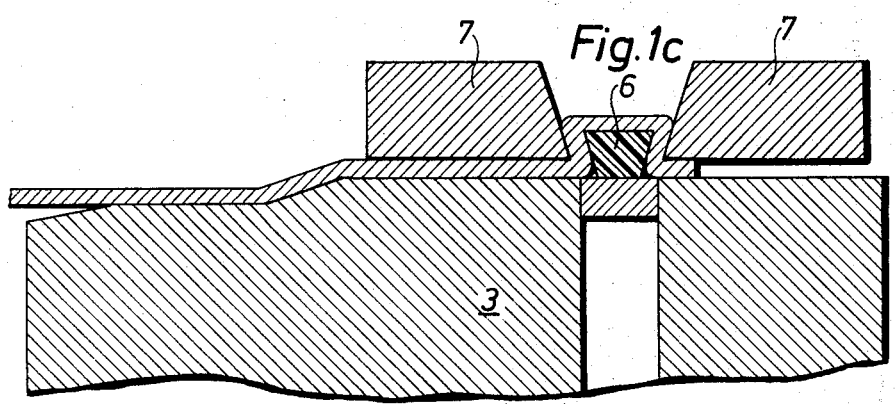

In accordance with FIGS. 1a, 1b and 1c the method according to the invention is used for providing the end portion of a pipe 1 with a socket 2 and a groove formed in the socket for retaining a sealing element. The mandrel 3 is used for forming the socket 2 and has a surface portion 4 with a shape and a size corresponding to the shape and the size of the socket. The end portion of the pipe which has been converted into the plastic state is pushed onto the mandrel in a conventional manner to the position shown in FIG. 1. The mandrel 3 has an annular element 5 which is extendable from the position shown in FIG. 1a. Before the pipe is pushed onto the mandrel 3 a sealing ring 6 is positioned in the outer surface of the annular element 5. After the pipe 1 has been pushed onto the mandrel the annular element 5 and thereby the sealing ring 6 are extended to the position shown in FIG. 1b wherein the wall of the socket 2 has been pushed out for defining a groove.

Finally the wall of the socket 2 is connected to the cross section shape of the sealing ring 6 by pressing a pair of jaws 7 against the pipe wall from the outside to the position shown in FIG. 1c. Thereupon the plastic material is chilled so that the material is converted into a rigid state. The mandrel 3 is withdrawn from the end portion of the pipe. Thereby, there is provided a pipe end portion which is provided with a socket in which a sealing ring is disposed. In accordance with this method of forming a pipe wall there are not required any forming element which has to be extended outside the outer surface of the mandrel and thereupon have to be withdrawn into the mandrel when the pipe socket is to be removed from the mandrel. Thus, the forming of the pipe wall is to a great extent facilitated in accordance with the invention.

Figure 2A:
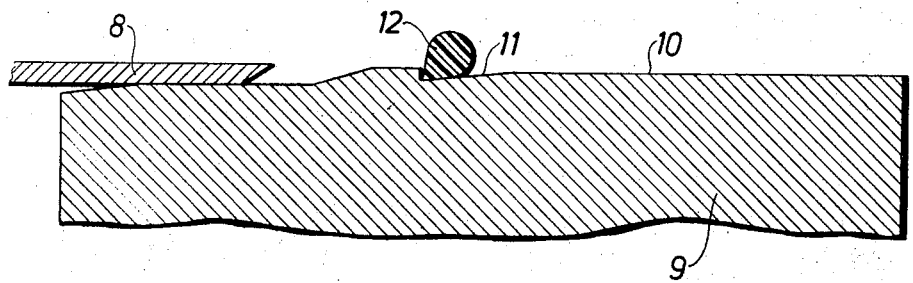
FIGS. 2a, 2b and 2c show a second embodiment of the invention.
Figure 2B:
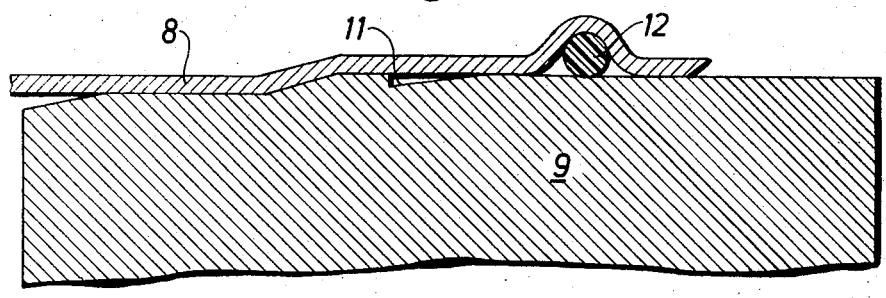
Figure 2C:
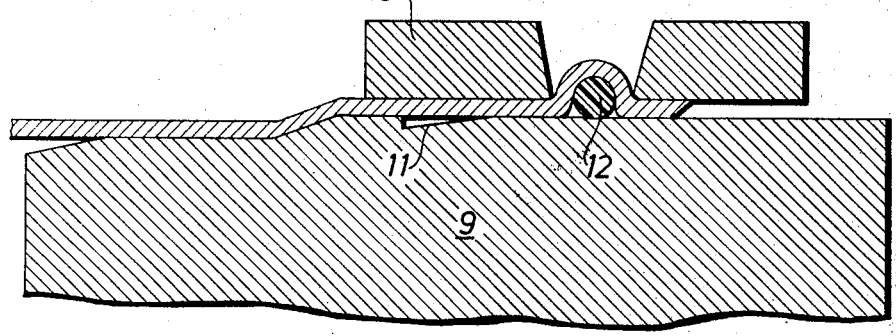

Also in accordance with FIGS. 2a, 2b and 2c the method is used for providing the end portion of a pipe with a socket having an inner groove. The end of a pipe 8 is pushed onto a mandrel 9 the outer surface of which has a portion 10 of a size and a shape corresponding to the inner surface of the socket. The surface portion 10 has a groove 11 in which a sealing ring 12 having a drop shaped cross section is positioned in accordance with FIG. 2a before the pipe end 8 is pushed onto the mandrel 9. When the pipe end 8 is pushed onto the mandrel the sealing ring 12 will roll between the outer surface of the mandrel 9 and the inner surface of the pipe wall, said sealing ring rolling up from the groove 11 to the position shown in FIG. 2b. The pipe wall will adapt to the outer surface of the mandrel 10 and the sealing ring as shown in FIG. 2b. As shown in FIG. 2c the pipe wall is pressed against the sides of the sealing element by means of jaws 13 for forming an undercut groove in which the sealing ring is retained. Finally the pipe wall is chilled and the jaws and the mandrel are removed. Thereby a pipe has been formed which is provided with a socket having an inner groove and a sealing ring fixedly positioned therein.

Figure 3A:
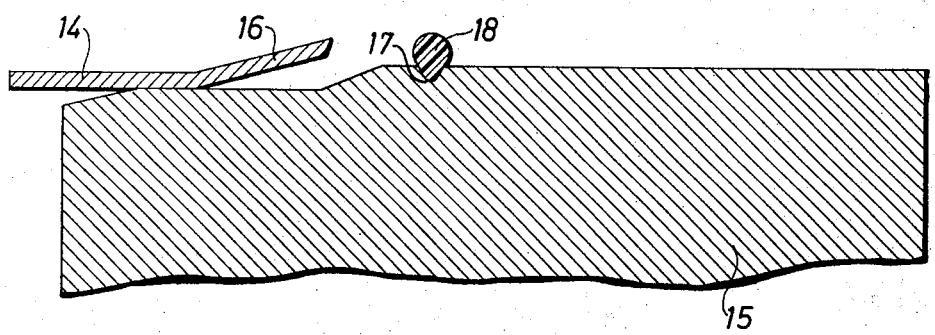
FIGS. 3a, 3b and 3c show a third embodiment of the invention.
Figure 3B:
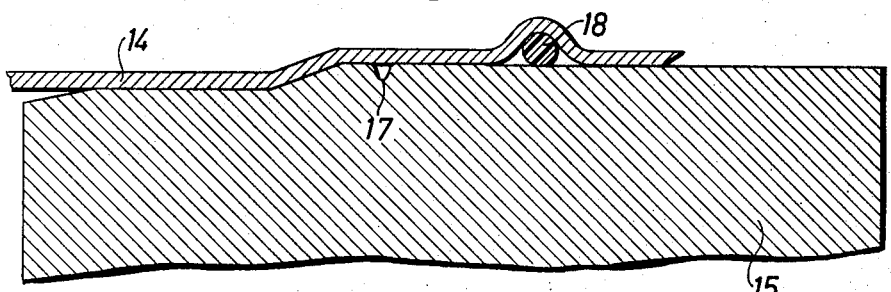
Figure 3C:
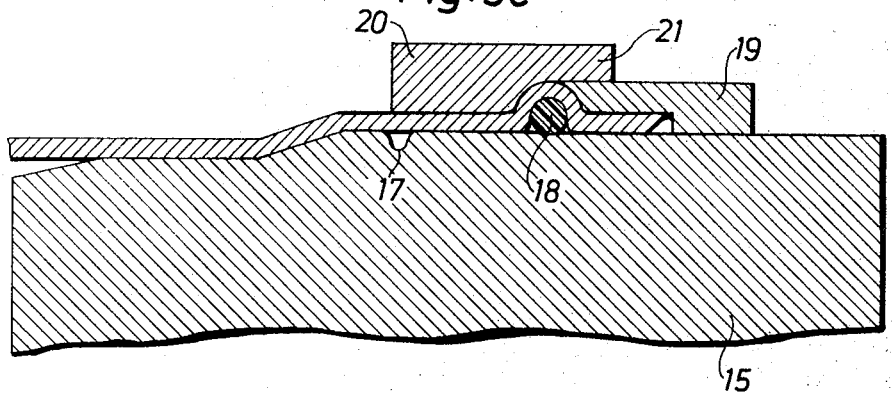

The embodiment of the invention shown in FIGS. 3a, 3b and 3c principally corresponds to the embodiment shown in FIGS. 2a, 2b and 2c. Before the end portion of a pipe 14 is pushed onto the mandrel 15 the pipe is provided with a slightly conical portion 16 in order to prevent that the sealing ring 18 positioned in a groove 17 in the mandrel is pushed in front of the end surface 3b the sealing ring 18 will roll up from the groove 17 when the pipe 14 is pushed onto the mandrel in order to form a groove for the sealing ring in the pipe wall. In accordance with FIG. 3c there is used a pair of jaws 19 and 20 for connecting the pipe wall to the sealing ring 18. The jaws 19 and 20 have portions pressing the pipe wall against the sides of the sealing ring 18 and also have a portion 21 providing a compression of the sealing ring from outside by pressing against the pipe wall radially inwards. After the pipe has been chilled the jaws 19 and 20 as well as the mandrel 15 are removed whereby the sealing ring is retained in the groove so formed.

Figure 4:
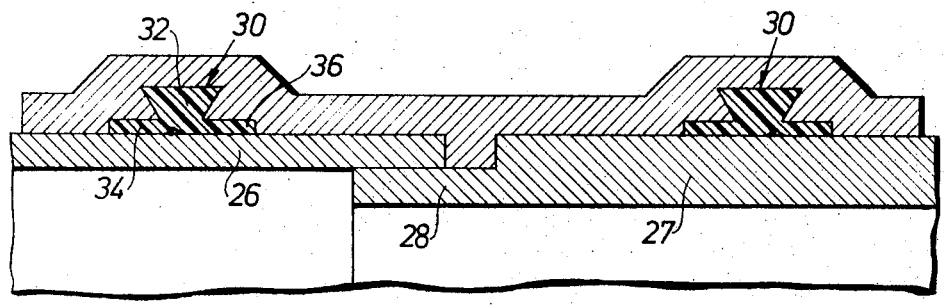
FIG. 4 shows a fourth embodiment of the invention.

In the embodiment shown in FIG. 4 the method is used for manufacturing a pipe socket for connecting non-socket or straight pipes. The socket is manufactured by means of a mandrel consisting of two portions 26 and 27. The mandrel portion 27 has a portion 28 partly introducible into the mandrel portion 26 and constituting the bottom of an annular groove constituted between the mandrel portions. A sealing ring 30 is stretched onto each of the mandrel portions, the sealing ring having a cross sectional shape shown in FIGS. 5 and 7 in the non stretched state. The ring has a main portion 32 adapted to be retained on a groove in the socket and two lips 34 and 36 extending out from the main portion 32 in an angle of about 90 degrees in relation to each other in the non stretched state of the ring. When the ring is stretched onto the mandrel the lips 34 and 36 are positioned substantially in alignment as shown in FIG. 4.

A thread or fiber reinforced plastic socket is formed around the mandrel 26 and 27 and the sealing rings 30 positioned therein in a conventional manner. The plastic socket is for example constituted by a glass fiber reinforced polyester socket. The socket is removed from the mandrel by separating the two mandrel portions 26 and 27. After being removed from the mandrel the socket has the appearance shown in FIG. 5. Thus, the socket has undercut grooves in which the main portion 32 of the sealing ring is retained, depressions 38 and 40 in correspondence to the lips 34 and 36 in the position of the lips when the sealing rings are positioned on the mandrel, and a central continuous inner projection 41 in correspondence with the groove formed between the mandrel portions 26 and 27. When the socket is removed from the mandrel the lips 34 and 36 spring out from their depressions 38 and 40 to the position in which they are directed inclined inwards the socket in opposite directions.

Figure 5:
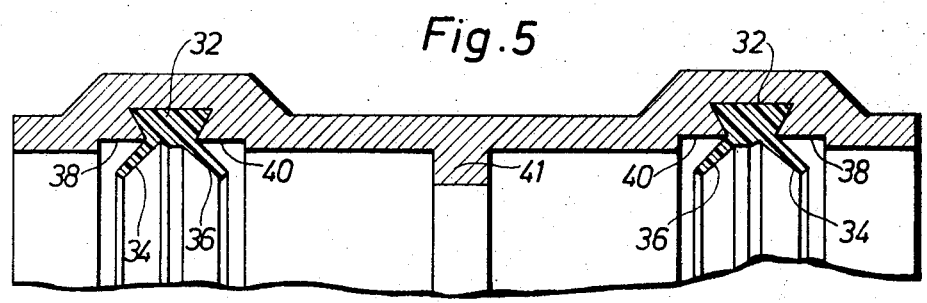
FIG. 5 shows a socket manufactured in accordance with the method of FIG. 4.
Figure 6:
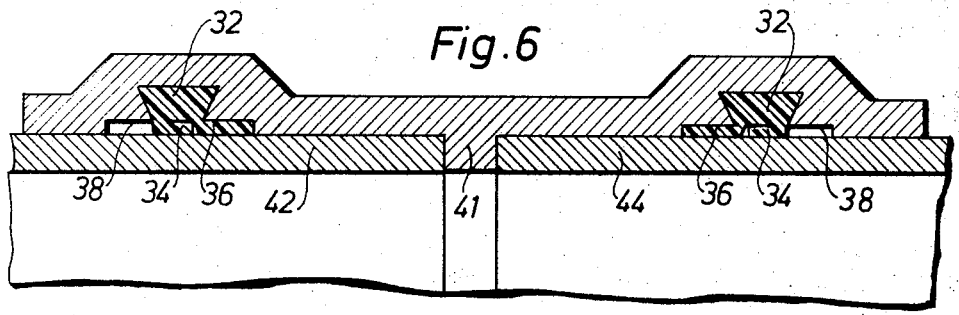
FIG. 6 shows the pipe socket of FIG. 4 in the position of use.

In FIG. 6 there is shown how the pipe socket according to the FIG. 5 is used for connecting two non-socket or straight pipes 42 and 44. The end portions of the pipes 42 and 44 are pushed into the socket from opposite sides thereof. When the ends of the pipes contact the lips 34 of the sealing rings adjacent the ends of the socket, the lip is turned inwards and upwards against the inwards directed surface of the main portion 32 of the sealing ring. When the pipe ends have been moved past the belonging sealing ring, the sealing rings have the position shown in FIG. 6, where the lip 34 of each sealing ring is compressed between the outer surface of the pipes and the inwards directed surface of the main portion 32 of each sealing ring. The pipes are pushed into the socket to a position where the end edges of the pipe contact the projection 41. At high inner pressure in the pipes the lips 34 and 36 are forced against the pipe wall and the bottom of the depression 40, respectively, bringing about an excellent sealing action.

Figure 7:
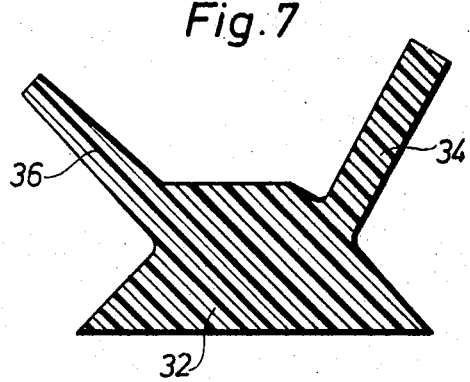
FIG. 7 is a section through a sealing element adapted to be used for accomplishing the method according to the invention.

FIG. 7 is a cross section of the sealing ring used in the socket according to FIGS. 4–6, inclusive, on an enlarged scale.

Figure 8:
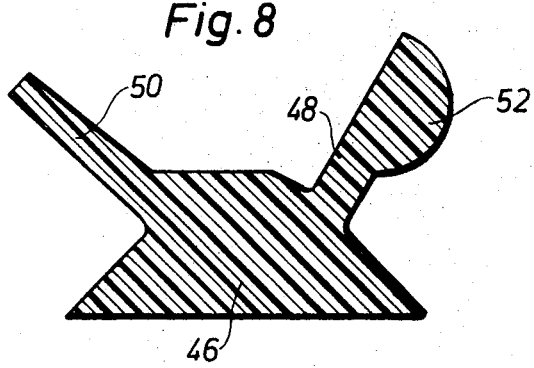
FIG. 8 shows another embodiment of a sealing element to be used for accomplishing the method according to the invention.

FIG. 8 is a section through another embodiment of a sealing ring to be used for example in a socket according to FIGS. 4–6, inclusive. Also this sealing ring has a main portion 46 and two sealing lips 48 and 50. The sealing lip 48 intended to be turned in against the main portion 46 by the pipe end introduced into the socket has a projection 52 which is adapted to contact the outer surface of the pipe introduced into the socket and has the object of providing a compression sealing at the sealing ring.

In accordance with the invention there has been provided a method of forming pipes of the type having grooves for retaining sealing elements, in which method the sealing elements are used as mold portions for forming the grooves and thereby make the use of separate mold portions for this object unnecessary. In the forming operation there is automatically obtained a fixing of the sealing element in the grooves belonging to the different sealing rings.

I claim:

1. A method of forming a socket in an end region of a normally rigid but softenable plastic member with the socket having an internal annular groove in which a resilient seal ring is disposed which comprises; softening the end region of the plastic member which is to be formed into a socket, deforming the softened region of the plastic member by the sealing ring to form said annular groove in the socket, pressing the plastic member radially inwardly and axially toward said sealing ring on both axial sides of said sealing ring, and causing said plastic member to become rigid in said softened region thereof with said sealing ring remaining in the said annular groove formed thereby; the sealing ring being mounted on a mandrel receivable in the softened region of the plastic member and the mandrel having an annular recess in which the ring is disposed and from which the ring protrudes radially, the method including the step of pushing the plastic member softened end foremost over said mandrel whereby said ring rolls out of the recess on the mandrel and whereby the pressure of the plastic member on the outside of the ring and the mandrel on the inside of the ring cause said ring to form the said groove in the plastic member.

2. A method of forming a socket in an end region of a pipe member with the socket having an internal annular groove in which a resilient sealing ring is disposed, the sealing ring having an annular body part and annular lips extending inwardly from the body part which comprises; mounting the ring on a mandrel about the size of the internal diameter of the body part with the lips deformed and extending axially in opposite directions on the mandrel and beyond the axial limits of said body part, the portions of the mandrel surface at each side of the sealing ring and the surface portion of the sealing ring projecting from said mandrel surface constituting a mold surface, forming a pipe wall around said mold surface, said surface portion of the sealing ring thereby forming a groove in the pipe wall and said pipe wall firmly engaging said projecting surface portion of the sealing ring for retaining the sealing ring in said groove with the lips disposed in annular recesses adjacent the said groove, and removing the mandrel leaving said sealing ring secured in said groove and permitting the lips to spring out of the annular recesses.

References Cited

UNITED STATES PATENTS

| | | | |
|---|---|---|---|
| 3,755,528 | 8/1973 | Gutlhuber | 264—322 |
| 2,446,281 | 8/1948 | Harding | 264—89 X |
| 3,520,047 | 7/1970 | Muhlner | 29—423 |
| 3,687,492 | 8/1972 | Leopold | 264—249 |
| 2,929,124 | 3/1960 | James | 25—127 |
| 3,377,659 | 4/1968 | Hucks | 18—19 |
| 2,361,933 | 11/1944 | Ferla | 25—30 |
| 2,446,281 | 8/1948 | Harding | 425—393 |

FOREIGN PATENTS 852,578  1957  Great Britain _____ 264—249

RICHARD R. KUCIA, Primary Examiner

U.S. Cl. X.R.

264—294, 296, 322